US010369911B2

(12) United States Patent
Imayou et al.

(10) Patent No.: US 10,369,911 B2
(45) Date of Patent: Aug. 6, 2019

(54) VEHICLE SEAT HEADREST

(71) Applicant: TACHI-S CO., LTD., Tokyo (JP)

(72) Inventors: Kazuya Imayou, Tokyo (JP); Toshiki Igarashi, Tokyo (JP); Yayoi Hirano, Tokyo (JP); Shunsuke Yamaoka, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/568,513

(22) PCT Filed: Apr. 19, 2016

(86) PCT No.: PCT/JP2016/062390
§ 371 (c)(1),
(2) Date: Oct. 23, 2017

(87) PCT Pub. No.: WO2016/171133
PCT Pub. Date: Oct. 27, 2016

(65) Prior Publication Data
US 2018/0134198 A1    May 17, 2018

(30) Foreign Application Priority Data
Apr. 23, 2015 (JP) ................. 2015-088207

(51) Int. Cl.
*B60N 2/888* (2018.01)
*B60N 2/844* (2018.01)
(Continued)

(52) U.S. Cl.
CPC ............ *B60N 2/888* (2018.02); *B60N 2/80* (2018.02); *B60N 2/844* (2018.02); *B60N 2/847* (2018.02); *B60N 2/856* (2018.02)

(58) Field of Classification Search
CPC ........ B60N 2/888; B60N 2/844; B60N 2/856; B60N 2/847; B60N 2/80
(Continued)

(56) References Cited

U.S. PATENT DOCUMENTS 5,820,211 A    10/1998  Heilig et al.
6,000,760 A *  12/1999  Chung ................ B60N 2/806
                                              297/408

FOREIGN PATENT DOCUMENTS

JP    1981-101052 U    8/1981
JP    H10-075844 A     3/1998
(Continued)

OTHER PUBLICATIONS

International Search Report for PCT/JP2016/062390 dated Aug. 2, 2016; English translation submitted herewith (6 pages).

*Primary Examiner* — Justin V Lewis
(74) *Attorney, Agent, or Firm* — Fitch, Even, Tabin & Flannery, LLP (57) ABSTRACT

The purpose of the present invention is to provide a headrest to be infallibly locked when returned from a forward tilted position to a using position, without requiring high part accuracy and assembly accuracy. A vehicle seat headrest (4) according to the present invention, having: a stay (402) held on the seat back side; and a headrest main body (4A) supported forward rotatably from a using position with respect to the stay (402), includes: a locking mechanism (500) that fixes a rotation position of the headrest main body (4A) with respect to the stay (402) in the using position; and a stopper mechanism (600) that is not engaged with a regulation part in the using position, but is engaged with the regulation part when the headrest main body (4A) is tilted backward from the using position, to regulate backward tilting of the headrest main body (4A).

9 Claims, 9 Drawing Sheets

(51) Int. Cl.
  *B60N 2/847* (2018.01)
  *B60N 2/856* (2018.01)
  *B60N 2/80* (2018.01)
(58) Field of Classification Search
  USPC ......... 297/61, 216.12, 220, 283.4, 391, 394,
  297/399, 406, 408
  See application file for complete search history.

(56) References Cited

FOREIGN PATENT DOCUMENTS

| | | |
|---|---|---|
| JP | 2006-087702 A | 4/2006 |
| JP | 2008-279979 A | 11/2008 |
| JP | 2012-061964 A | 3/2012 |

\* cited by examiner

VEHICLE SEAT HEADREST

CROSS-REFERENCE TO RELATED APPLICATIONS

This application is a U.S. national phase application filed under 35 U.S.C. § 371 of International Application No. PCT/JP2016/062390, filed Apr. 19, 2016, designating the United States, which claims priority from Japanese Patent Application No. 2015-088207, filed Apr. 23, 2015, which are hereby incorporated herein by reference in their entirety.

TECHNICAL FIELD

The present invention relates to a headrest for a vehicle seat which is used in a vehicle and on which an occupant is seated.

BACKGROUND ART

In some vehicle seats, a forward tiltable headrest which is forward tiltable from a using position by releasing a locking function is used. A headrest described in Japanese Patent Application Laid-Open No. 2006-87702 (Patent Literature 1) is known as this type of headrest.

The Patent Literature 1 discloses a vehicle seat device having a locking mechanism for fixing a head rest attached to the top of a seat back in a using position, and an unlocking mechanism for unlocking the locked state by the locking mechanism. The locking mechanism is provided with a locking plate attached to a rotary shaft of the head rest, and an engagement hook engaged with the locking plate. The unlocking mechanism is provided with an operation rod projecting from the top of the seat back toward the headrest (see the Abstract). Further, in the vehicle seat device in the Patent Literature 1, one locking mechanism is provided on the rotary shaft of the headrest. The locking mechanism is provided in the vicinity of one of two hinge parts provided at both ends of an insert stay of the headrest in the width direction (see FIG. 2).

CITATION LIST

Patent Literature

PTL 1: Japanese Patent Application Laid-Open No. 2006-87702

SUMMARY OF INVENTION

Technical Problem

In the headrest in the Patent Literature 1, it is necessary to maintain a locked state of the headrest with one locking mechanism. In some cases, the headrest receives a strong impact force due to shaking of the occupant's head in a longitudinal direction upon vehicle collision. The headrest when receives this impact force is offset-transformed. Accordingly, the locking mechanism of the headrest is required to have strength to suppress offset transformation even upon application of strong impact force to the headrest. In particular, when the locking mechanism is provided in a biased position in the width direction, the offset transformation is large on the opposite side to the side provided with the locking mechanism. Since it is necessary to ensure the strength to suppress the offset transformation, it is not easy to downsize the locking mechanism.

It is conceivable that two locking mechanisms are provided on the rotary shaft of the headrest, so as to enhance the strength of the locking mechanism, and these locking mechanisms are provided in the vicinity of two hinge parts provided in the insert stay of the headrest. As described in the Patent Literature 1, generally, the locking mechanism is configured such that an engagement claw of the engagement hook is engaged with an engagement groove of the locking plate. When plural locking mechanisms having this configuration are provided, it is necessary to improve part accuracy of the headrest and to improve assembly accuracy for synchronization of the respective locking mechanisms. Further, to synchronize the respective locking mechanisms, a connecting shaft or the like to connect the engagement hooks provided in the respective locking mechanisms is required. Thus the number of parts is increased.

The object of the present invention is to provide a headrest capable of infallible locking upon returning from a forward tilted position to a using position, without requiring high part accuracy and high assembly accuracy, and suppressing offset transformation in a locked state in the using position.

Solution to Problem

To attain the above-described object, the present invention provides a vehicle seat headrest having a stay held on the seat back side, and a headrest main body supported forward rotatably from a using position with respect to the stay, including: a locking mechanism that fixes a rotation position of the headrest main body with respect to the stay in the using position; and a stopper mechanism that is not engaged with (away from) a regulation part in the using position, but is engaged with the regulation part when the headrest main body is tilted backward from the using position, to regulate backward tilting of the headrest main body.

Advantageous Effects of Invention

According to the present invention, it is possible to provide a headrest capable of infallible locking upon returning from a forward tilted position to a using position, without requiring high part accuracy and high assembly accuracy, and suppressing offset transformation in a locked state in the using position.

DESCRIPTION OF EMBODIMENT

Hereinbelow, an embodiment according to the present invention will be described.

Figure 1:
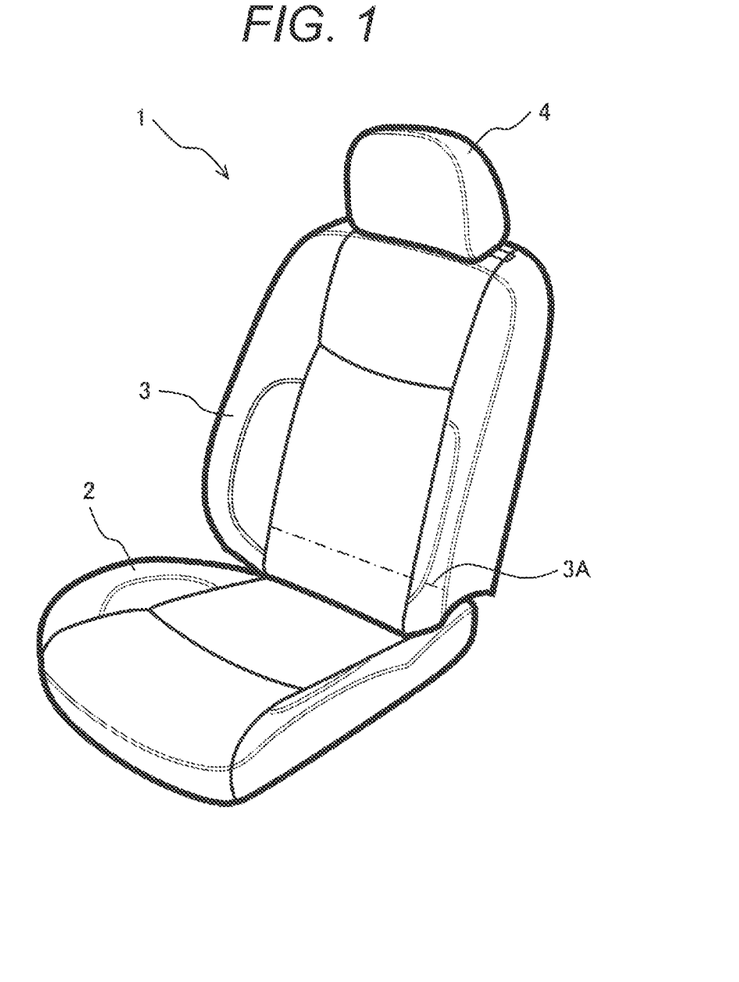
FIG. 1 is a perspective view of a vehicle seat according to an embodiment of the present invention.

FIG. 1 is a perspective view of a vehicle seat according to the embodiment of the present invention.

As shown in FIG. 1, a vehicle seat 1 has a seat cushion 2 on which a person is seated, a seat back 3 which is provided upright at a rear end of the seat cushion, and a headrest 4 provided at an upper end of the seat back 3. The seat cushion 2 is attached, in a status where its position is adjustable in a longitudinal direction, to the floor of the vehicle. The seat back 3 is connected, in a rotatable status about a rotary shaft 3A provided at the lower end, to the seat cushion 2. The headrest 4 is attached, in a height-position adjustable state, to the seat back 3. A frame as a structural member, and cushion material such as resin foam, are provided inside the seat cushion 2, the seat back 3, and the headrest 4. The surface of the cushion material is covered with a cover. Note that in FIG. 1, the cushion material and the rotary shaft 3A covered with a cover are indicated with an alternate long and short dash line.

Figure 2:
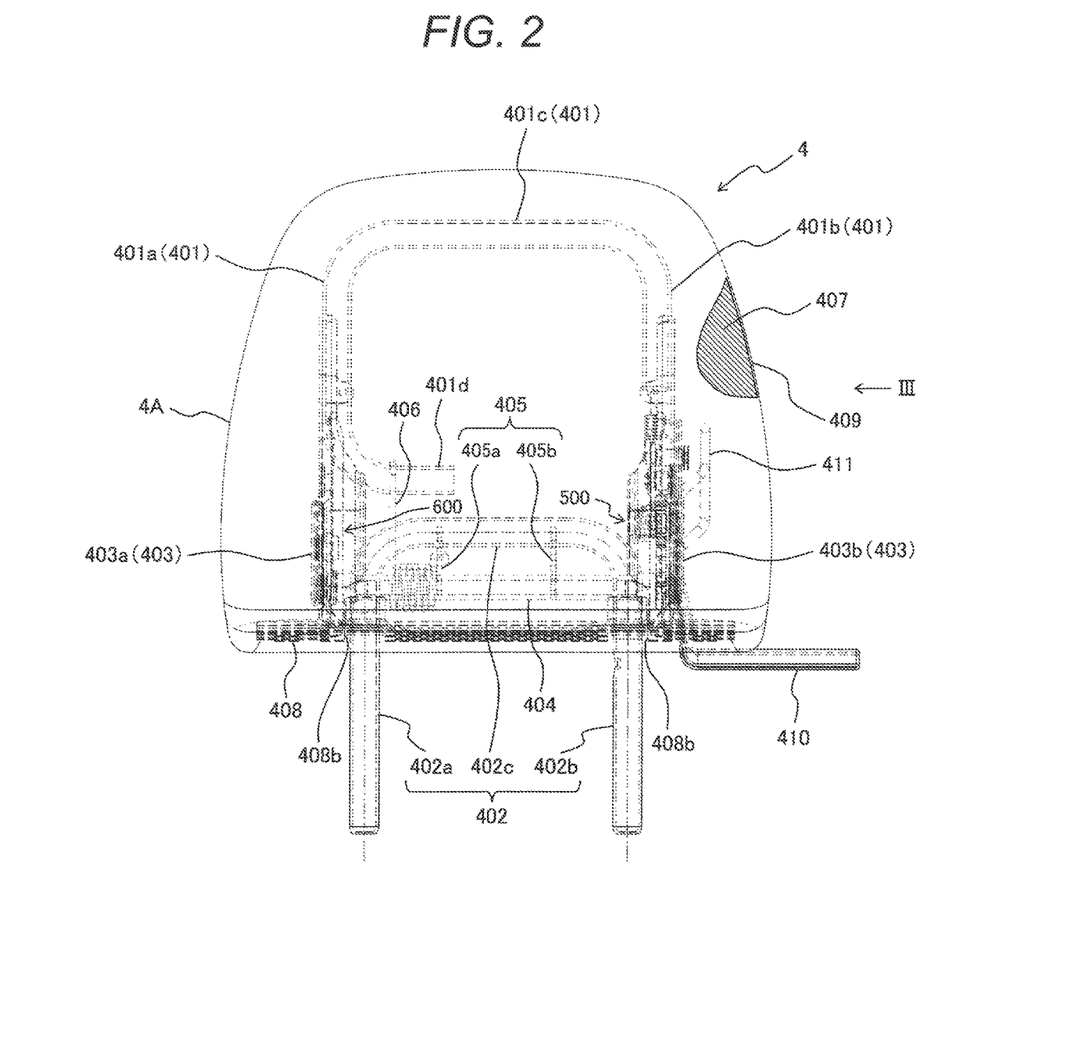
FIG. 2 is a plan view (front view) of a headrest according to the embodiment of the present invention viewed from the front.
Figure 3:
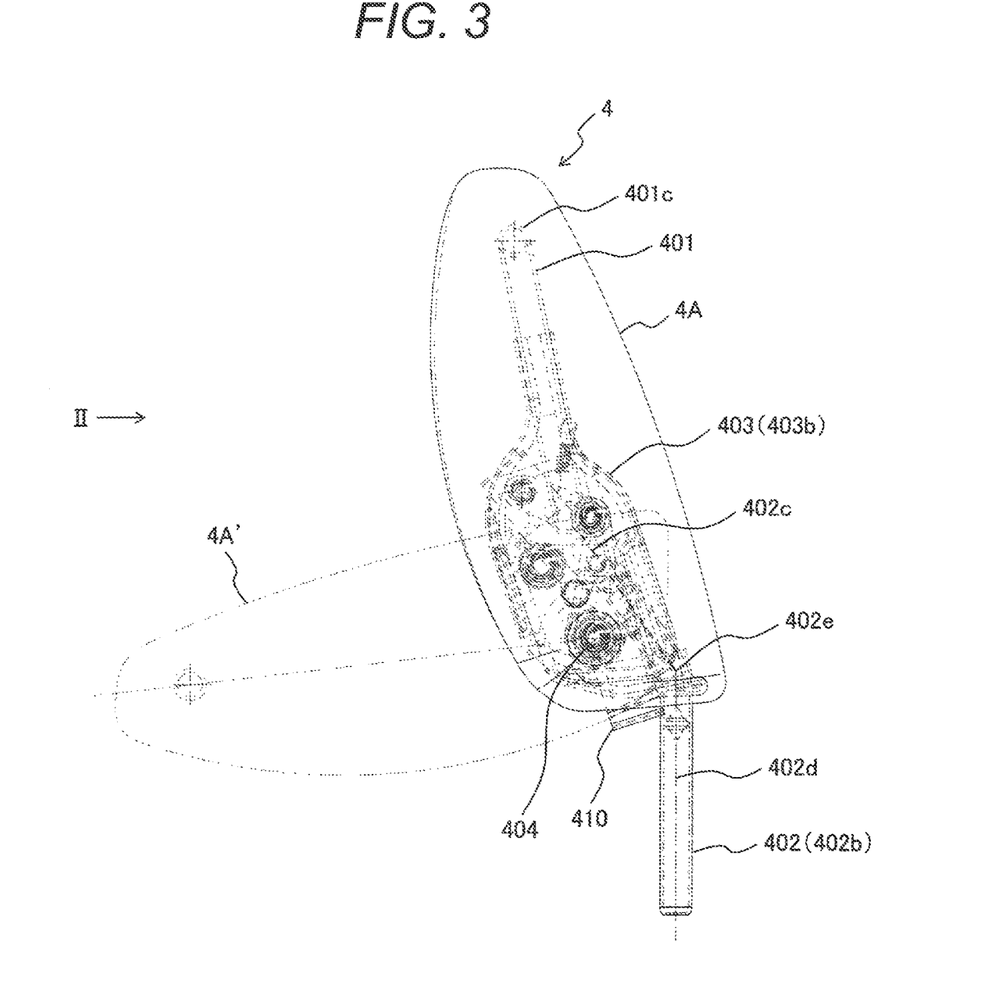
FIG. 3 is a plan view (side view) of the headrest according to the embodiment of the present invention viewed from the side.

FIG. 2 is a plan view (front view) of the headrest according to the embodiment of the present invention viewed from the front. FIG. 3 is a plan view (side view) of the headrest according to the embodiment of the present invention viewed from the side. Note that FIG. 2 is a diagram viewed from an arrow II direction in FIG. 3. FIG. 3 is a diagram viewed from an arrow III direction in FIG. 2. FIG. 2 and FIG. 3 represent a main body frame 401 and the like which are provided inside and seen through an exterior covering. Further, FIG. 2 represents the headrest in a partially-cutaway state.

The headrest 4 has a main body frame 401, a stay 402, a hinge part 403, a rotary shaft (tiltable shaft) 404, a connecting part 405, a biasing member 406, cushion material 407, a lower cover (bottom cover) 408, skin 409, and an operation strap 410.

The main body frame 401 is a strength member as a skeletal structure of a headrest main body 4A and is made of metal. The main body frame 401 has a right frame part 401a, a left frame part 401b, and a connecting frame part 401c connecting the right frame part 401a to the left frame part 401b. An extension part 401d bent toward the inside of the headrest 4 is provided at a lower end of the right frame part 401a.

The right frame part 401a is a frame part provided on the right side of the vehicle seat 1 in the width direction and extended in the vertical direction. The left frame part 401b is a frame part provided on the left side of the vehicle seat 1 in the width direction and extended in the vertical direction. The right frame part 401a and the left frame part 401b are extended in the vertical direction, however, they may be not only extended but tilted from the vertical direction.

The connecting frame part 401c is a frame part which connects the right frame part 401a to the left frame part 401b. The connecting frame part 401c connects the upper end side of the right frame part 401a to the upper end side of the left frame part 401b. The respective connecting parts draw a curve.

The main body frame 401 has an approximately quadrangle shape (approximately rectangular shape), in which each corner is made of a curve, with the right frame part 401a, the left frame part 401b, the connecting frame part 401c and the extension part 401d. The right frame part 401a, the left frame part 401b, the connecting frame part 401c, and the extension part 401d respectively have a linear portion.

The linear portion of the right frame part 401a and the linear portion of the left frame part 401b are parallel to each other. The linear portion of the connecting frame part 401c forms a 90 degree angle (right angle) with respect to the linear portion of the right frame part 401a and the linear portion of the left frame part 401b. The linear portion of the extension part 401d is parallel to the linear portion of the connecting frame part 401c, and forms a 90 degree angle (right angle) with respect to the linear portion of the right frame part 401a.

The stay 402 is a member which protrudes downward from the main body 4A of the headrest 4, and supports the main body 4A on the seat back 3, as a mainstay. The stay 402 has a right stay part 402a, a left stay part 402b, and a connecting stay part 402c which connects the right stay part 402a to the left stay part 402b. The connecting stay part 402c connects the upper end side of the right stay part 402a to the upper end side of the left stay part 402b. The respective connecting parts draw a curve.

The stay 402 is formed in an inverse U shape with the right stay part 402a, the left stay part 402b and the connecting stay part 402c. The right stay part 402a, the left stay part 402b, and the connecting stay part 402c respectively have a linear portion. The linear portion of the right stay part 402a and the linear portion of the left stay part 402b are parallel to each other. The linear portion of the connecting stay part 402c forms a 90 degree angle (right angle) with respect to the linear portion of the right stay part 402a and the linear portion of the left stay part 402b.

Note that the linear portion of the connecting stay part 402c is provided in a position lower than the lower end of the main body frame 401. That is, the extension part 401d formed at the lower end of the right frame part 401a is positioned in a higher position than (above) the linear portion of the connecting stay part 402c.

As indicated with an alternate long and short dash line 402d in FIG. 3, the left stay part 402b is bent at an upper end 403e of the linear portion. Further, the right stay part 402a is bent at an upper end of the linear portion as in the case of the left stay part 402b. As the right stay part 402a and the left stay part 402b are respectively provided with a bent portion 403e, the connecting stay part 402c is provided over the upper side of the rotary shaft 404.

The hinge part 403 is provided at a lower end of the main body frame 401. The hinge part 403 has a right hinge part 403a provided at a lower end of the right frame part 401a and a left hinge part 403b provided at a lower end of the left frame part 401b. The hinge part 403 will be described in detail later.

The rotary shaft (tiltable shaft) 404 is connected to the right hinge part 403a and the left hinge part 403b. However, the rotary shaft (tiltable shaft) 404 is not fixed with respect to the right hinge part 403a and the left hinge part 403b. That is, the right hinge part 403a and the left hinge part 403b are connected with respect to the rotary shaft 404 rotatably about the rotary shaft 404.

The rotary shaft 404 is a straight-line bar-type member. In the present embodiment, a round bar member having a hollow circular cross section is used. The rotary shaft 404 is parallel to the linear portion of the connecting stay part 402c and the linear portion of the connecting frame part 401c.

Further, the rotary shaft 404 is provided in a position lower than the linear portion of the connecting stay part 402c. That is, the rotary shaft 404 is provided below the linear portion of the connecting stay part 402c.

The connecting part 405 is a member which connects the rotary shaft 404 to the linear portion of the connecting stay part 402c. The connecting part 405 has a right connecting part 405a and a left connecting part 405b positioned at both ends of the linear portion of the connecting stay part 402c. The rotary shaft 404 and the connecting stay part 402c are fixed with the both connecting parts 405a and 405b.

The biasing member 406 is a member which is provided between the rotary shaft 404 and the main body frame 401, and which pushes the main body frame 401 forward. The biasing member 406 is formed with a coil spring. It is fitted around the rotary shaft 404. That is, the coil spring 406 is attached to the rotary shaft 404 such that the rotary shaft 404 is inserted through the center of the coil spring 406. One end of the coil spring 406 is latched on the right connecting part 405a. The other end of the coil spring 406 is latched on the extension part 401d of the main body frame 401.

The extension part 401d of the main body frame 401 forms a latch part of the coil spring 406. As the latch part, not only the extension part 401d of the main body frame 401 but any member may be used as long as the other end of the coil spring 406 is latched on the main body frame 401 side. Further, not only the right connecting part 405a but any part may be used as long as the one end of the coil spring 406 is latched on the stay 402 side. With this configuration, the coil spring 406 pushes the headrest main body 4A such that the headrest main body 4A is tilted forward. In FIG. 3, the status where the headrest main body 4A is tilted forward is indicated with reference numeral 4A'.

The cushion material 407 is provided so as to cover the entire periphery of the main body frame 401, the hinge part 403, the rotary shaft 404, the connecting part 405 and the biasing member 406. Further, the cushion material 407 covers an upper end of the stay 402.

The lower cover (bottom cover) 408 is attached to an opening formed at a lower end of the cushion material 407. The lower cover 408 will be described in detail later.

The skin 409 covers an external surface of the cushion material. The skin 409 may be provided so as to cover the outer periphery of the lower cover 408.

Figure 4:
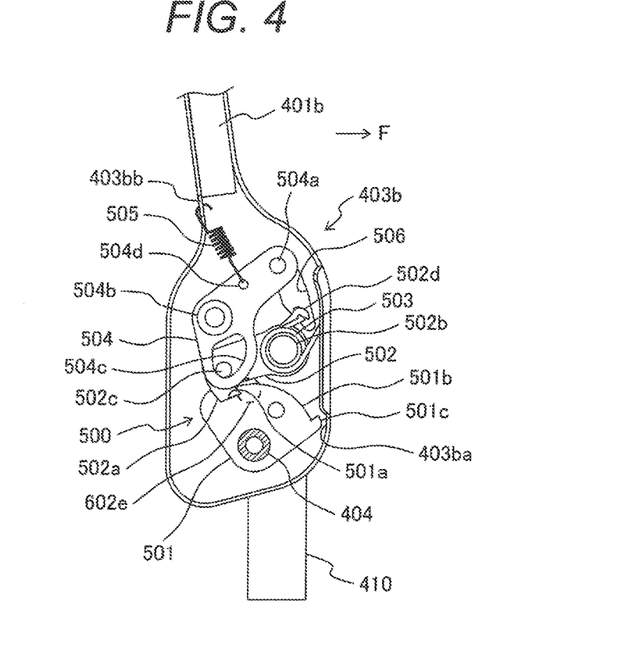
FIG. 4 is a plan view of a structure of a left hinge part (locked state) of the headrest according to the embodiment of the present invention.

The operation strap 410 is used for releasing operation for a locking mechanism 500 (see FIG. 4). It is possible to tilt the headrest main body 4A forward by releasing the locking mechanism 500.

Figure 5:
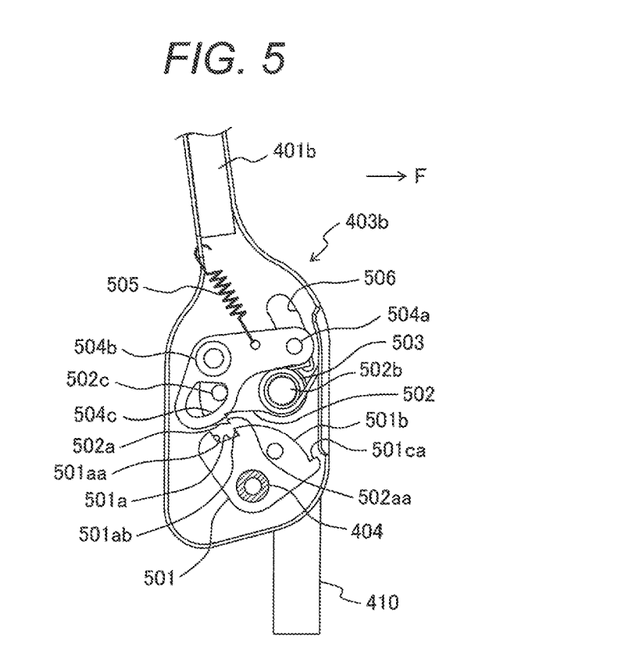
FIG. 5 is a plan view of the structure of the left hinge part (unlocked state) of the headrest according to the embodiment of the present invention.

Next, the hinge part 403 will be described using FIG. 4 to FIG. 6. The headrest according to the present embodiment has the stay 402 held on the seat back side, and the headrest main body 4A supported forward rotatably from a using position with respect to the stay 402. The hinge part 403 is a member which connects the main body frame 401 of the headrest main body 4A rotatably with respect to the stay 402.

FIG. 4 is a plan view showing the structure of the left hinge part (locked state) of the headrest according to the embodiment of the present invention.

The locking mechanism 500 is provided on the back surface of the left hinge part 403b. The locking mechanism 500 has a rotary plate 501, an engagement hook 502, an engagement hook biasing spring 503, an operation lever 504, and an operation lever biasing spring 505.

The rotary plate (rocking plate) 501 is fixed to the rotary shaft 404. The rotary plate 501 rocks (rotates) about the rotary shaft (rocking shaft) 404 with respect to the left hinge part 403b upon tilting of the headrest main body 4A. Otherwise, upon tilting of the headrest main body 4A, the left hinge part 403b rocks with respect to the rotary plate 501.

The rocking of the left hinge part 403b and the rotary plate 501 are relative. Actually, as the rotary plate 501 is on the fixed side, the left hinge part 403b rocks with respect to the rotary plate 501.

The rotary plate 501 is provided with an engagement groove 501a and a sliding surface 501b. The engagement groove 501a forms an engagement part with which the engagement hook 502 is engaged. As the engagement hook 502 is engaged with the engagement groove 501a, the locking mechanism 500 enters a locked state. The sliding surface 501b is a curved surface on which the engagement hook 502 disengaged from the engagement groove 501a slides when the headrest main body 4A is tilted toward a front direction F or returned from a tilted position to the using position. In the present embodiment, the sliding surface 501b is a circular arc-shaped surface around the center of the rotary shaft 404.

The rotary plate 501 is provided with a protruding portion 501c in contact with an edge 403ba of the left hinge part 403b. In normal time, a gap exists between the protruding portion 501c and the edge 403ba, and the protruding portion 501c and the edge 403ba are not in contact with each other. When a strong force acts on the headrest main body 4A, the protruding portion 501c and the edge 403ba are mutually in contact with each other, to receive the force acting on the headrest main body 4A. With this configuration, it is possible to prevent the headrest main body 4A from tilting toward the rear side (backward tilting).

In the engagement groove 501a of the rotary plate 501, the height of a side surface 501aa is higher than the height of a side surface 501ab. This relation is set such that when the headrest main body 4A is returned from the tilted position to the using position, the engagement claw 502a of the engagement hook 502 slides on the sliding surface 501b while it is infallibly engaged with the engagement groove 501a.

Further, it is possible to prevent engagement failure between the engagement hook 502 and the rotary plate 501 by preventing the end of the engagement claw 502a from being removed from the side surface 501aa of the engagement groove 501a when the engagement claw 502a of the engagement hook 502 is pulled up. When the headrest main body 4A is tilted backward in a status where the end of the engagement claw 502a is out of the side surface 501aa of the engagement groove 501a, there is a possibility that the engagement between the engagement hook 502 and the rotary plate 501 is disengaged.

The engagement hook 502 is attached to the left hinge part 403b rockably about a rocking shaft 502b. That is, the rocking shaft 502b is provided in the left hinge part 403b. The engagement hook 502 has the engagement claw (hook) 502a engaged with the engagement groove 501a of the rotary plate 501 at its one end. An engagement pin (engagement protruding portion) 502c engaged with the operation lever 504 is provided in the vicinity (one end) of the engagement claw 502a. Further, the engagement hook 502 has a biasing spring latch part 502d, on which the one end of the engagement hook biasing spring 503 is latched, at an end on the other end side provided with the rocking shaft 502b.

The engagement hook biasing spring 503 is a coil spring. It is provided on the rocking shaft 502b of the engagement hook 502. The engagement hook biasing spring 503 is latched on the biasing spring latch part 502d of the engagement hook 502 at its one end. The engagement hook biasing spring is engaged with the edge 403ba of the left hinge part 403b at the other end. With this configuration, the engagement hook biasing spring 503 pushes the engagement hook 502 in a direction where the engagement claw 502a of the engagement hook 502 is engaged with the engagement groove 501a of the rotary plate 501.

The operation lever 504 has a bent shape, and a rocking shaft 504b is provided in a bent portion. The rocking shaft 504b is provided in the left hinge part 403b. The operation lever 504 has a connecting pin (connecting part) 504a. The operation strap 410 to release the locking mechanism 500 is connected to one end of the connecting pin. Further, the operation lever 504 has an opening (engagement part) 504c engaged with the engagement pin 502c of the engagement hook 502 at its other end. The inner peripheral surface of the engagement part 504c forms a guide surface to guide the engagement pin 502c when the operation lever 504 rocks about the rocking shaft 504b.

The operation lever biasing spring 505 is formed with a coil spring. In the operation lever biasing spring 505, one end is latched on a latch part 403bb provided at the edge 403ba of the left hinge part 403b and the other end is latched on a latch part 504d of the operation lever 504.

The operation lever biasing spring 505 pushes the operation lever 504 so as to pull up the connecting pin 504a side of the operation lever 504. With this configuration, in a status where the operation strap 410 is not pulled, the engagement part 504c of the operation lever 504 is a lowered position. The engagement claw 502a of the engagement hook 502 is engaged with the engagement groove 501a of the rotary plate 501.

The left hinge part 403b is provided with an opening 506 to project the connecting pin 504a with which the operation strap 410 is connected, to the surface side. The operation lever 504 is pushed with the operation lever biasing spring 505, and the connecting pin 504a side is pulled up. At this time, the rocking operation of the operation lever 504 is regulated in a position where the connecting pin 504a is in contact with the upper end of the opening 506.

Here the operation of the locking mechanism 500 will be described. FIG. 5 is a plan view showing the structure of the left hinge part (unlocked state) of the headrest according to the embodiment of the present invention.

In the present embodiment, the operation strap 410 is operated upon release of the locking mechanism 500. That is, the locking mechanism 500 is released by pulling operation of the operation strap 410. By pulling the operation strap 410, the operation lever 504 rocks about the rocking shaft 504b, and the connecting pin 504a side of the operation lever 504 is pulled down. Further, when the operation lever 504 rocks, the engagement part 504c side of the operation lever 504 rises, and the engagement claw 502a of the engagement hook 502 is guided with a guide surface of the engagement part 504c and is pulled up. At this time, the engagement hook 502 rocks about the rocking shaft 502b, and the engagement claw 502a is pulled out of the engagement groove 501a of the rotary plate 501.

When the engagement claw 502a is pulled out of the engagement groove 501a, the locking mechanism 500 is released. Then the headrest main body 4A becomes tiltable. As the operation strap 410 is not pulled during tilting of the headrest main body 4A, the end surface of the engagement claw 502a is in contact with the sliding surface 501b of the rotary plate 501 and slides on the sliding surface 501b.

The headrest main body 4A is tiled until a side surface 502aa of the engagement claw 502a becomes into contact with a side surface 501ca of the protruding portion 501c. The side surface 501ca of the protruding portion 501c forms a regulation part which regulates the tilting range of the headrest main body 4A.

The side surface 501aa of the engagement groove 501a forms a first rotation range regulation part to regulate the rotation range of the headrest main body 4A on the using position side. For this purpose, the side surface 501aa of the engagement groove 501a is formed to be higher than the side surface 501ab. The side surface 501ca of the protruding portion 501c forms a second rotation range regulation part to regulate the tilting of the headrest main body 4A on the tilted position side. The engagement groove 501a is provided in the inside of the rotation range of the first rotation range regulation part 501aa. The sliding surface 501b is provided between the engagement groove 501a and the second rotation range regulation part 501ca.

Figure 6:
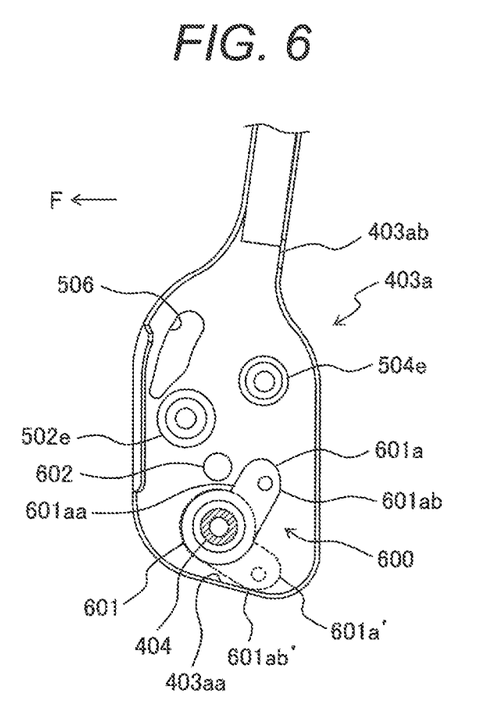
FIG. 6 is a plan view of a structure of a right hinge part (locked time) of the headrest according to the embodiment of the present invention.

FIG. 6 is a plan view showing the structure of the right hinge part (when locked) of the headrest according to the embodiment of the present invention.

A simple stopper mechanism 600 is provided on the back surface of the right hinge part 403a. The stopper mechanism 600 has a stopper member 601 and a regulation part (regulation pin) 602. Note that in FIG. 6, the position (posture) of the stopper member 601 in a status where the headrest main body 4A is tilted is indicated with a broken line 601a'.

The stopper member 601 has a stopper piece 601a and is fixed to the rotary shaft 404. The stopper piece 601a rocks with respect to the right hinge part 403a upon tilting of the headrest main body 4A. Otherwise, upon tilting of the headrest main body 4A, the right hinge part 403a rocks with respect to the stopper piece 601a.

The rocking of the right hinge part 403a and the stopper piece 601a are relative. Actually, as the stopper piece 601a is on the fixed side, the right hinge part 403a rocks with respect to the stopper piece 601a.

The regulation part 602 is fixed to the back surface of the right hinge part 403a. When the headrest main body 4A is in the using position, a gap is formed between the regulation part 602 and an edge 601aa of the stopper piece 601a. The regulation part 602 and the stopper piece 601a are not in contact with each other. With this configuration, on the locking mechanism 500 side, it is possible to infallibly establish engagement between the engagement claw 502a of the engagement hook 502 and the engagement groove 501a of the rotary plate 501.

When a backward impact force acts on the headrest main body 4A and the headrest main body 4A is tilted backward (backward tilting), the regulation part 602 and the stopper piece 601a come into contact (engaged) with each other. That is, the regulation part 602 is engaged with the stopper member 601 (stopper piece 601a) when the headrest main body 4A is further tilted backward from the using position, to regulate the backward tilting range of the headrest main body 4A. With this configuration, the backward impact force which acts on the headrest main body 4A is shared with the locking mechanism 500 and the stopper mechanism 600. It is possible to enhance supporting strength for the headrest main body 4A.

In the structure where the headrest main body 4A is supported with the locking mechanism 500 provided at one end of the rotary shaft 404 in the axial direction, when a force acts on the headrest main body 4A, the amount of displacement (offset transformation) on the other end side, in comparison with the one end side provided with the locking mechanism 500, is increased. In the present embodiment, as the stopper mechanism 600 is provided on the other end side, and the stopper mechanism 600 supports the headrest main body 4A on the other end side, it is possible to reduce the offset transformation.

As described above, in the present embodiment, one locking mechanism 500 to lock the tiling of the headrest main body 4A is provided. With this configuration, it is not necessary to synchronize two locking mechanisms and not necessary to attain high part accuracy and high assembly accuracy. When the headrest main body 4A is returned from the forward-tilted position to the using position, it is possible to infallibly lock the headrest main body 4A. Further, in the present embodiment, the simple stopper mechanism 600 to share the impact force is provided. With this configuration, it is possible to stably support the headrest main body 4A in the using position even with respect to a strong impact force.

Further, in the present embodiment, the stopper mechanism 600 plays a role of regulating the tilting of the headrest main body 4A. When the headrest main body 4A is tilted, the stopper piece 601a becomes in a posture indicated with the broken line 601a' with respect to the right hinge part 403a. At this time, a portion 601ab (601ab') of the stopper piece 601a (601a') comes into contact with the edge 403aa of the right hinge part 403a. With this configuration, the tilting of the headrest main body 4A is limited, and the tilting beyond a necessary tilting range is regulated.

That is, the stopper member 601 and the stopper piece 601a play a role of regulating the tilting of the headrest main body 4A in addition to the role of sharing the backward impact force. With this configuration, in the locking mechanism 500, it is possible to prevent the engagement claw 502a of the engagement hook 502 from dropping from the protruding portion 501c of the rotary plate 501.

As described above, when the headrest main body 4A is tilted backward in the status where the end of the engagement claw 502a is out of the side surface 501aa of the engagement groove 501a, there is a possibility that engagement failure occurs between the engagement hook 502 and the rotary plate 501. Otherwise, when the headrest main body 4A is tilted backward in the status where a torsional force acts between the main body frame 401 and the stay 402, and the engagement claw 502a is out of the engagement groove 501a in the axial direction of the rocking shaft 502b, there is a possibility that engagement failure occurs between the engagement hook 502 and the rotary plate 501. However, in the present embodiment, when the headrest main body 4A is tilted backward, as the stopper piece 601a and the regulation part 602 come into contact with each other, to prevent further backward tilting, it is possible to prevent the engagement failure between the engagement hook 502 and the rotary plate 501.

The stopper mechanism 600 has a more simple structure and the number of parts is smaller in comparison with the locking mechanism 500. Accordingly, it is possible to attain cost reduction and assembly time reduction.

In the present embodiment, a pedestal (mounting portion) 502e for the engagement hook 502, a pedestal (mounting portion) 504e for the operation lever 504, and the opening 506 through which the connecting pin 504a is inserted, are provided on the back surface of the right hinge part 403a (see FIG. 6). Further, the latch part 403ab to latch the operation lever biasing spring 505 is provided at the edge 403aa of the right hinge part 403a.

The regulation part 602 is removed and the stopper member 601 is replaced with the rotary plate 501. The engagement hook 502 is mounted on the pedestal 502e, and the operation lever 504 is mounted on the pedestal 504e. Further, the engagement hook biasing spring 503 and the operation lever biasing spring 505 are mounted. With this configuration, it is possible to exchange the stopper mechanism 600 in the right hinge part 403a with the locking mechanism 500.

A pedestal (mounting portion) 602e (see FIG. 4) for the regulation part 602 is provided on the back surface of the left hinge part 403b. The rotary plate 501 is replaced with the stopper member 601 and the regulation part 602 is mounted on the pedestal 602e. Further, the engagement hook biasing spring 503 and the operation lever biasing spring 505 are removed, and the engagement hook 502 and the operation lever 504 are removed. With this configuration, it is possible to exchange the locking mechanism 500 in the left hinge part 403b with the stopper mechanism 600.

In the present embodiment, the right hinge part 403a and the left hinge part 403b are provided with the pedestal 502e for the engagement hook 502, the pedestal 504e for the operation lever 504, the pedestal 602e for the regulation part 602, the latch part 403ab for the operation lever biasing spring 505, and the opening 506 through which the connecting pin 504a is inserted, in common. With this configuration, it is possible to freely select the locking mechanism 500 and the stopper mechanism 600, and attach them to the right hinge part 403a and the left hinge part 403b. In this manner, it is not necessary to individually product the hinge part for the locking mechanism 500 and the hinge part for the stopper mechanism 600, and it is possible to reduce the production cost. Further, it is possible to attain ad-hoc control excess and deficiency of parts.

Note that the locking mechanism 500 has a slight clearance between the engagement claw 502a of the engagement hook 502 and the engagement groove 501a of the rotary plate 501. Accordingly, to be precise, the headrest main body 4A slightly rotates with respect to the stay 402 even in the locked state, and offset transformation occurs.

In the status where the headrest main body is locked in the using position, the stopper mechanism 600 has a gap greater than the clearance between the engagement claw 502a and the engagement groove 501a, between the stopper piece 601a and the regulation part 602. Accordingly, offset transformation greater than that on the locking mechanism 500 side occurs on the stopper mechanism 600 side. However, as the stopper piece 601a and the regulation part 602 are engaged with each other, it is possible to prevent occurrence of further offset transformation.

Figure 7:
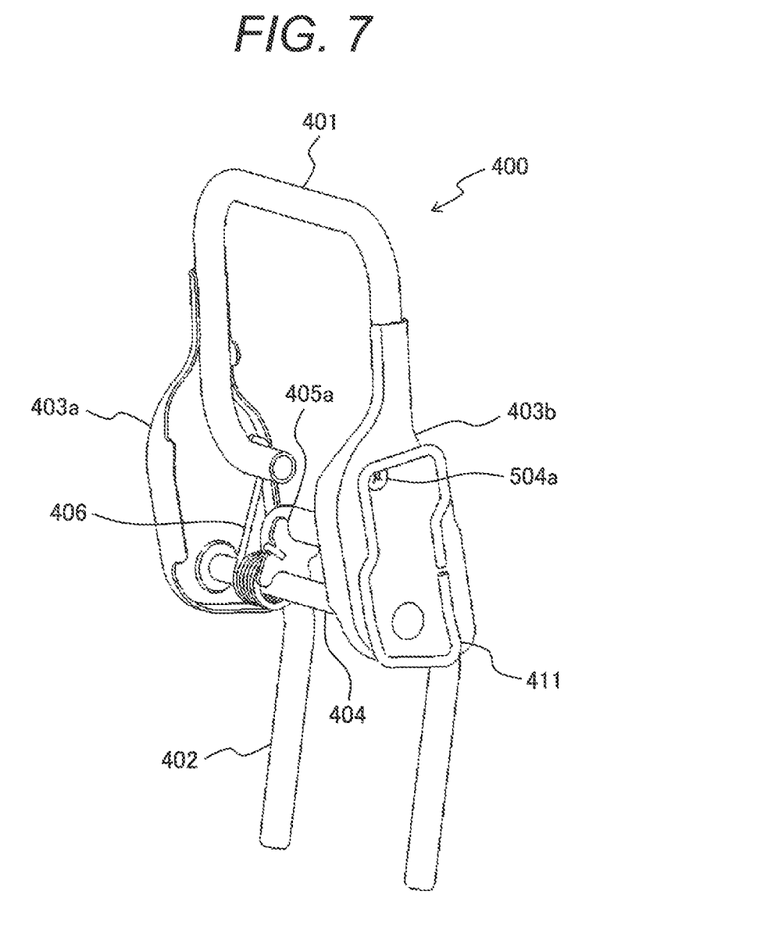
FIG. 7 is a perspective view showing a mechanism assembly formed by assembling a main body frame, a stay, hinge parts, a rotary shaft, a connecting part and a biasing member, regarding the headrest according to the embodiment of the present invention.

FIG. 7 is a perspective view showing a mechanism assembly formed by assembling the main body frame, the stay, the hinge parts, the rotary shaft, the connecting part and the biasing member, regarding the headrest according to the embodiment of the present invention.

A mechanism assembly 400 as a skeletal structure of the headrest 4 is formed by assembling the main body frame 401, the stay 402 and the hinge part 403. Note that in FIG. 7, a status where the operation strap 410 is not assembled. The operation strap 410 is connected to the connecting pin (connecting part) 504a. Further, a frame member 411 to guide the operation strap 410 is provided on the surface (outer surface in the width direction) of the right hinge part 403b.

Figure 8:
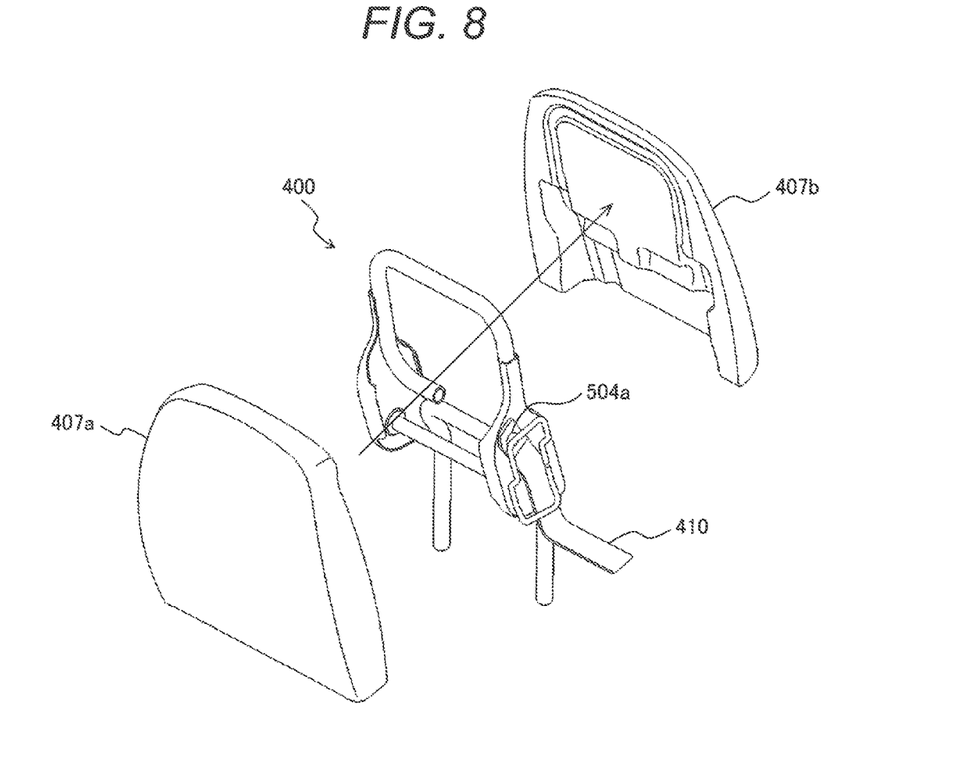
FIG. 8 is an exploded perspective view showing the headrest in exploded state according to the embodiment of the present invention.

FIG. 8 is an exploded perspective view showing the headrest in exploded state according to the embodiment of the present invention.

In the mechanism assembly 400, cushion material 407a is assembled from the front side, and cushion material 407b is assembled from the rear side.

As shown in FIG. 8, the operation strap 410 is assembled so as to be inserted through the inside of the frame member 411. The frame member 411 ensures space where the operation strap 410 is provided in the inside of the cushion material. It prevents rubbing between the cushion material and the operation strap 410.

The lower cover (bottom cover) 408 (see FIG. 2) is attached to the assembly of the mechanism part 400, the cushion material 407a and the cushion material 407b, from the lower side. The skin 409 covers over the cushion material 407a and the cushion material 407b.

Next, the lower cover 408 will be described using FIG. 9 to FIG. 13.

Figure 9:
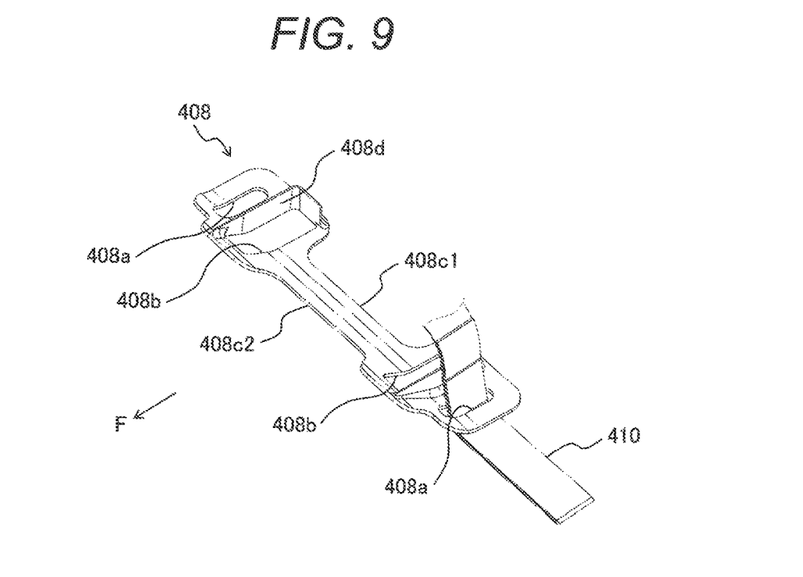
FIG. 9 is a perspective view showing a lower cover.

FIG. 9 is a perspective view showing the lower cover.

The lower cover 408 has an opening 408a, an opening 408b, a concave portion 408c1, and a partition wall 408d. The lower cover 408 is made of resin.

The opening 408a is formed at both ends of the lower cover 408 in the width direction of the vehicle seat 1. The operation strap 410 is inserted through the opening 408a. The operation strap 410 is provided only one side of the headrest 4 in the width direction of the vehicle seat 1. For example, in a left seat, the operation strap 410 is provided on the left side of the headrest 4. In a right seat, the operation strap 410 is provided on the right side of the headrest 4.

In the present embodiment, the opening 408a is provided at the both ends of the lower cover 408 such that the operation strap 410 may be provided on any side. With this configuration, it is possible to delete the distinction between the lower cover 408 for the right seat headrest 4 and the lower cover 408 for the left seat headrest 4, and to communize the parts.

The right stay part 402a and the left stay part 402b are inserted through the opening 408b. For this purpose, the opening 408b is provided in spaced two positions in the width direction.

The opening 408b is provided in inside of the opening 408a. That is, the opening 408b is positioned closer to the center of the lower cover 408 with respect to the opening 408a.

The opening 408b has a size in the longitudinal direction not so as to interfere with the right stay part 402a and the left stay part 402b between the using position and the tilted position of the headrest main body 4A. Further, the size in the width direction is slightly greater than the thickness of the right stay part 402a and the left stay part 402b.

The concave portion 408c1 is formed between a left opening formation part 408e1 where the opening 408a and the opening 408b are formed and a right opening formation part 408e2, in a shape concaved from the rear side toward the front side. That is, it is formed at the center of the lower cover 408 in the width direction. By providing the concave portion 408c1, upon vehicle collision or the like when the rear seat occupant comes into contact with the front seat headrest 4, the possibility of contact between the rear seat occupant and the lower cover 408 is reduced.

The partition wall 408d is provided around the opening 408b. In particular, the partition wall 408d is provided along the edge on the right hinge part 403a side and the left hinge part 403b side.

Figure 10:
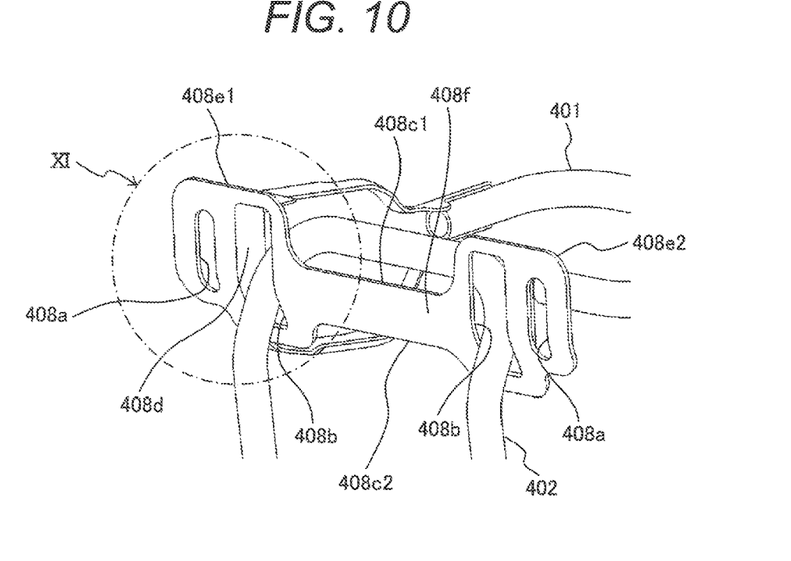
FIG. 10 is a perspective view showing a status where the lower cover is assembled to the mechanism assembly.

FIG. 10 is a perspective view showing a status where the lower cover is assembled to the mechanism assembly.

The lower cover 408, where the right stay part 402a and the left stay part 402b are inserted through the two openings 408b, is assembled to the headrest 4.

In the present embodiment, a concave portion 408c2 is formed on the front side opposite to the concave portion 408c1. The concave portion 408c2 is formed between the left opening formation part 408e1 and the right opening formation part 408e2 in a shape concaved from the front side toward the rear side. With this configuration, the lower cover 408 has a shape where the left opening formation part 408e1 and the right opening formation part 408e2 are connected with a thin connecting part 408f.

In the present embodiment, the locking mechanism 500 or the stopper mechanism 600 is provided on the side of the respective back surfaces of the right hinge part 403a and the left hinge part 403b. Upon tilting of the headrest 4, when the user touches the headrest main body 4, there is a possibility that the user's finger enters the headrest main body 4, to touch the locking mechanism 500 or the stopper mechanism 600.

Figure 13:
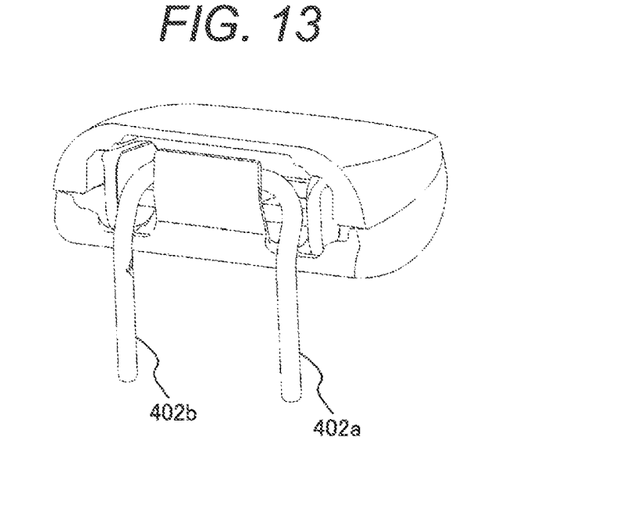
FIG. 13 is a perspective view of the headrest as a comparative example with respect to the present invention viewed from a lower surface side.

FIG. 13 is a perspective view of the headrest as a comparative example with respect to the present invention viewed from the lower surface side.

In the comparative example, the difference from the present embodiment is that the lower cover 408 is not provided. The configuration where the cushion material 407 directly covers the mechanism assembly 400, and further, the skin 409 covers over the cushion material is the same as that of the present embodiment.

When the lower cover 408 is not provided, a large opening occurs on the periphery of the right stay part 402a and the left stay part 402b. The finger inserted from this opening may easily reach the locking mechanism 500 and the stopper mechanism 600 formed in the hinge part 403.

In the present embodiment, in the configuration where the cushion material 407 directly covers the mechanism assembly 400, and further, the skin 409 covers the cushion material, the resin lower cover 408 covers only the lower part of the headrest main body 4A. In this case, the lower cover 408 covers the vicinity of the hinge part 403, leaving a minimum opening around the right stay part 402a and the left stay part 402b. With this configuration, it is possible to prevent the user's finger from erroneously touching the locking mechanism 500 and the stopper mechanism 600.

Further, the cushion material 407 directly covers the mechanism assembly 400. A cover part of resin or the like to cover the mechanism assembly 400 is not provided. Accordingly, it is possible to reduce the number of parts, and downsize the headrest.

As the partition wall 408d is provided along the edge of the opening 408b on the hinge part 403 side, it prevents the user's finger from erroneously touching the locking mechanism 500 and the stopper mechanism 600.

In the present embodiment, the rotary plate 501 and the stopper piece 601a of the stopper member 601 are in contact with the edge 403aa of the right hinge part 403a and the edge 403ba of the left hinge part 403b. The partition wall 408d infallibly prevents insertion between the rotary plate 501 and the stopper piece 601a, and between the edge 403aa of the right hinge part 403a and the edge 403ba of the left hinge part 403b.

Figure 11:
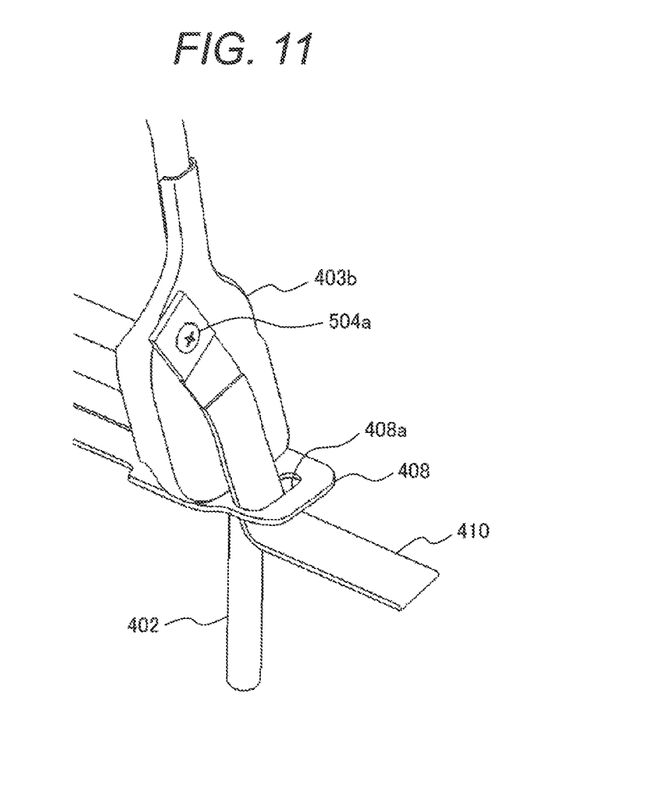
FIG. 11 is a perspective view of the left hinge part viewed from the front side.

FIG. 11 is a perspective view of the left hinge part viewed from the front side. FIG. 11 shows an XI part in FIG. 10 viewed from another angle.

The operation strap 410 is connected to the connecting pin 504a. Further, the operation strap 410 is inserted through the opening 408a of the lower cover 408. When the user pulls the operation strap 410 in an arrow direction in the figure, the user can infallibly pull down the connecting part of the operation strap 410 connected to the connecting pin 504a. With this configuration, the connecting pin 504a is pulled down downward in the opening 506, and the operation lever 504 is correctly operated.

That is, the connecting pin 504a smoothly operates by application of an operation force in a circumferential direction about the rocking shaft 504b with respect to the connecting pin 504a of the operation lever 504. Even when an operation force from the connecting pin 504a toward the rocking shaft 504b or an operation force toward the opposite direction is acted on the connecting pin 504a, the connecting pin 504a does not smoothly operate.

In the present embodiment, it is possible to apply an operation force in the circumferential direction about the rocking shaft 504b with respect to the connecting pin 504a by operating the operation strap 410 in its length direction. The opening 408a of the lower cover 408 guides the operation strap 410 such that the operation force by the operation strap 410 acts in the circumferential direction about the rocking shaft 504b with respect to the connecting pin 504a between the opening 408a and the connecting pin 504a.

In this manner, as the opening 408a is provided, the lower cover 408 also functions as a guide member to guide the operation strap 410 in a correct operation direction.

Figure 12:
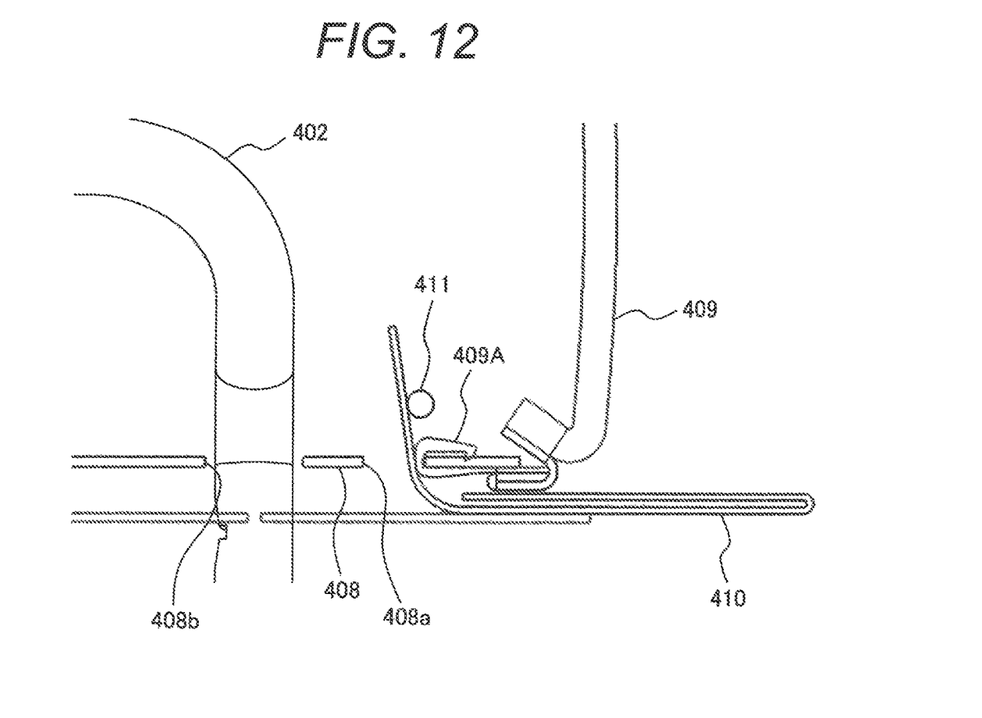
FIG. 12 is a cross-sectional view showing an assembled status of the lower cover and skin material.

FIG. 12 is a cross-sectional view showing an assembled status of the lower cover and the skin material.

The skin 409 covers the cushion material 407, and a hook 409A sewn at a lower end is latched through the opening 408a on the lower cover 408. In this manner, the lower cover 408 also serves as a latch part member for the skin 409.

REFERENCE SIGNS LIST

1 . . . vehicle seat,
2 . . . seat cushion,
3 . . . seat back,
4 . . . headrest,
4A . . . headrest main body,
401 . . . main body frame,
401a . . . right frame part,
401b . . . left frame part,
401c . . . connecting frame part,
401d . . . main body frame extension part,
402 . . . stay,
402a . . . right stay part,
402b . . . left stay part,
402c . . . connecting stay part,
403 . . . hinge part,
403a . . . right hinge part,
403aa . . . edge of right hinge part,
403ab . . . latch part,
403b . . . left hinge part,
403ba . . . edge of left hinge part,
403e . . . bent portion of respective stay part,
404 . . . rotary shaft (tiltable shaft),
405 . . . connecting part,
405a . . . right connecting part,
405b . . . left connecting part,
406 . . . biasing member,
407 . . . cushion material,
408 . . . lower cover (bottom cover),
408a . . . opening,
408b . . . opening 408b,
408c . . . concave portion,
408c1 . . . concave portion,
408c2 . . . concave portion,
408d . . . partition wall,
408e1 . . . left opening formation part,
408e2 . . . right opening formation part,
408f . . . connecting part,
409 . . . skin,
410 . . . operation strap,
411 . . . frame member,
500 . . . locking mechanism,
501 . . . rotary plate,
501a . . . engagement groove,
501aa, 501ab . . . side surface of engagement groove 501a,
501b . . . sliding surface,
501c . . . protruding portion,
502 . . . engagement hook,
502a . . . engagement claw,
502b . . . rocking shaft,
502c . . . engagement pin (engagement protruding portion),
502d . . . biasing spring latch part,
502e . . . pedestal for engagement hook,
503 . . . engagement hook biasing spring,
504 . . . operation lever,
504a . . . connecting pin (connecting part),
504b . . . rocking shaft,
504c . . . engagement part,
504d . . . latch part,
504e . . . pedestal for operation lever,
505 . . . operation lever biasing spring,
506 . . . opening connecting pin 504a is inserted through,
601 . . . stopper member,
601a . . . stopper piece,
601aa . . . edge of stopper piece 601a,
602 . . . regulation part (regulation pin).

The invention claimed is:

1. A vehicle seat headrest having: a stay held on a seat back side; and a headrest main body supported so as to be rotatable in a forward direction from a using position with respect to the stay, comprising:
a locking mechanism that fixes a rotation position of the headrest main body with respect to the stay in the using position; and a stopper mechanism that is not engaged with a regulation part in the using position, but is engaged with the regulation part when the headrest main body is tilted backward from the using position, to regulate backward tilting of the headrest main body,
wherein the locking mechanism has: an engagement hook which has an engagement claw, and which rocks about a first rocking shaft; and a rotary plate having an engagement groove, which the engagement claw is engaged with, and which rotates about a rotary shaft, and
wherein the stopper mechanism has: a stopper member which has a stopper piece, and which rocks about a second rocking shaft; and a rocking range regulation part, which is engaged with the stopper piece, and which regulates a rocking range of the stopper piece.

2. The vehicle seat headrest according to claim 1,
wherein the headrest main body has: a main body frame which forms a strength member; and a right hinge part and a left hinge part which connect the main body frame rotatably with respect to the stay, and
wherein the locking mechanism is provided in one of the right hinge part and the left hinge part, and the stopper mechanism is provided in the other one of the right hinge part and the left hinge part.

3. The vehicle seat headrest according to claim 2,
wherein, when the headrest main body is tilted, the stopper piece of the stopper member comes into contact with a hinge side, to regulate a tilting range.

4. The vehicle seat headrest according to claim 3,
wherein the first rocking shaft is provided in one of the right hinge part and the left hinge part, and the rocking range regulation part is provided in the other one of the right hinge part and the left hinge part.

5. The vehicle seat headrest according to claim 4, further comprising a rotary shaft fixed to the stay,
wherein the rotary shaft is rotatably connected with respect to the right hinge part and the left hinge part, and
wherein the rotary plate and the stopper member are fixed to the rotary shaft.

6. The vehicle seat headrest according to claim 5,
wherein the rotary plate has: a first rotation range regulation part which regulates a rotation range of the headrest main body on the using position side; and a second rotation range regulation part which regulates the rotation range on the tilted position side.

7. The vehicle seat headrest according to claim 6,
wherein the rotary plate has the engagement groove in an inside of the rotation range of the first rotation range regulation part, and has a sliding surface on which the engagement claw of the engagement hook slides, between the engagement groove and the second rotation range regulation part.

8. The vehicle seat headrest according to claim 7, further comprising:
an operation lever that rocks about a third rocking shaft provided in the one of the right hinge part and the left hinge part provided with the first rocking shaft, to operate the engagement hook; and an operation lever biasing member that pushes the operation lever,
wherein a latch part, on which one end of the operation lever biasing member is latched, is provided in the one of the right hinge part and the left hinge part.

9. The vehicle seat headrest according to claim 8,
wherein a mounting portion for the rocking range regulation part is provided in the one the right hinge part and the left hinge part, and
wherein a mounting portion for the engagement hook, a mounting portion for the operation lever, and a latch part for the operation lever biasing member, is provided in the other one of the right hinge part and the left hinge part.

* * * * *